(12) United States Patent
Watanabe et al.

(10) Patent No.: US 9,484,034 B2
(45) Date of Patent: Nov. 1, 2016

(54) VOICE CONVERSATION SUPPORT APPARATUS, VOICE CONVERSATION SUPPORT METHOD, AND COMPUTER READABLE MEDIUM

(71) Applicant: KABUSHIKI KAISHA TOSHIBA, Minato-ku, Tokyo (JP)

(72) Inventors: Nayuko Watanabe, Kanagawa (JP); Satoshi Kamatani, Kanagawa (JP); Kazuo Sumita, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 92 days.

(21) Appl. No.: 14/621,854

(22) Filed: Feb. 13, 2015

(65) Prior Publication Data
US 2015/0228280 A1    Aug. 13, 2015

(30) Foreign Application Priority Data
Feb. 13, 2014    (JP) ................. 2014-025902

(51) Int. Cl.
*G10L 15/26*    (2006.01)
*G10L 13/00*    (2006.01)
(Continued)

(52) U.S. Cl.
CPC ........... *G10L 15/26* (2013.01); *G06F 17/2872* (2013.01); *G10L 15/22* (2013.01); *G10L 15/1822* (2013.01); *G10L 2015/088* (2013.01); *G10L 2015/221* (2013.01)

(58) Field of Classification Search
CPC .................. G06F 17/30867; G06F 17/30247; G06F 17/30321; G06F 17/30575; G06F 17/30654; G06F 17/30675; G06F 17/30684; G06F 17/30696; G06F 17/30864; G06F 17/30221; G06N 5/04

USPC .......................... 704/235; 707/710; 434/362
See application file for complete search history.

(56) References Cited

U.S. PATENT DOCUMENTS

2002/0128818 A1    9/2002    Ho et al.
2006/0206481 A1    9/2006    Ohkuma et al.
(Continued)

FOREIGN PATENT DOCUMENTS

JP    09034895 A    2/1997
JP    2005222316 A    8/2005
(Continued)

OTHER PUBLICATIONS

M.A. Hearst, "TextTiling: Segmenting Text into Multi-paragraph Subtopic Passages", Computational Linguistics, vol. 23, No. 1, Mar. 1997, pp. 33-64.
(Continued)

*Primary Examiner* — Charlotte M Baker
(74) *Attorney, Agent, or Firm* — Holtz, Holtz & Volek PC

(57) ABSTRACT

According to one embodiment, a voice conversation support apparatus includes an input unit, a first determination unit, a second determination unit, a third determination unit, and a scoring unit. The input unit accepts a text data input according to a voice input mode and another input mode. The first determination unit extracts at least one subject keyword representing a current subject from the text data input. The second determination unit estimates a category of a word that can be an answer. The third determination unit calculates a question pair likelihood. The scoring unit calculates a score about a priority of each input mode.

10 Claims, 15 Drawing Sheets

(51) Int. Cl.
  *G10L 15/08* (2006.01)
  *G06F 17/28* (2006.01)
  *G10L 15/18* (2013.01)
  *G10L 15/22* (2006.01)

(56) References Cited

U.S. PATENT DOCUMENTS

| | | |
|---|---|---|
| 2006/0271350 A1 | 11/2006 | Chino et al. |
| 2009/0222257 A1 | 9/2009 | Sumita et al. |
| 2010/0145673 A1 | 6/2010 | Cancedda et al. |
| 2012/0296647 A1 | 11/2012 | Kobayashi et al. |
| 2014/0006007 A1 | 1/2014 | Sumita et al. |
| 2014/0272914 A1* | 9/2014 | Baraniuk ............. G06N 99/005 434/362 |
| 2015/0186528 A1* | 7/2015 | Rao ................... G06F 17/30867 707/710 |

FOREIGN PATENT DOCUMENTS

| | | |
|---|---|---|
| JP | 2006252382 A | 9/2006 |
| JP | 2006301968 A | 11/2006 |
| JP | 2006330298 A | 12/2006 |
| JP | 2008158985 A | 7/2008 |
| JP | 2009205579 A | 9/2009 |
| JP | 2014010623 A | 1/2014 |
| WO | 2011064829 A1 | 6/2011 |

OTHER PUBLICATIONS

Y. Ichimura, et al., "A Study of the RElations among Question Answering, Japanese Named Entity Extraction, and Named Entity Taxonomy", IPSJ SIG Technical Report, May 13, 2004, pp. 17-24.

* cited by examiner

| Subject keyword | Belonging words |
|---|---|
| Kanko | Kanko, tsua, onsen, temapaku, sekaiisan, (o)?miyage,... |
| Shuhen | Kono (chiiki\|shuhen\|eria\|atari) |
| Chimei | Tokyo, Kanagawa,... |
| Kotsu | Basutei, eki, intachenji,... |
| Kaimono | (O)?miyage, shouhin, seru, bagen,... |
| ⋮ | ⋮ |

F I G. 3

| Sentence pattern | Description |
|---|---|
| Where | Question about place |
| Which | Question to which selection is made from options |
| What | Question about definition of objects |
| WhatTime | Question about current time |
| HowMuch | Question about quantity |
| YesNo | Question to which YES/NO is answered |
| Request | Request type positive representation |
| Affirm | Insistence type negative representation |

F I G. 4

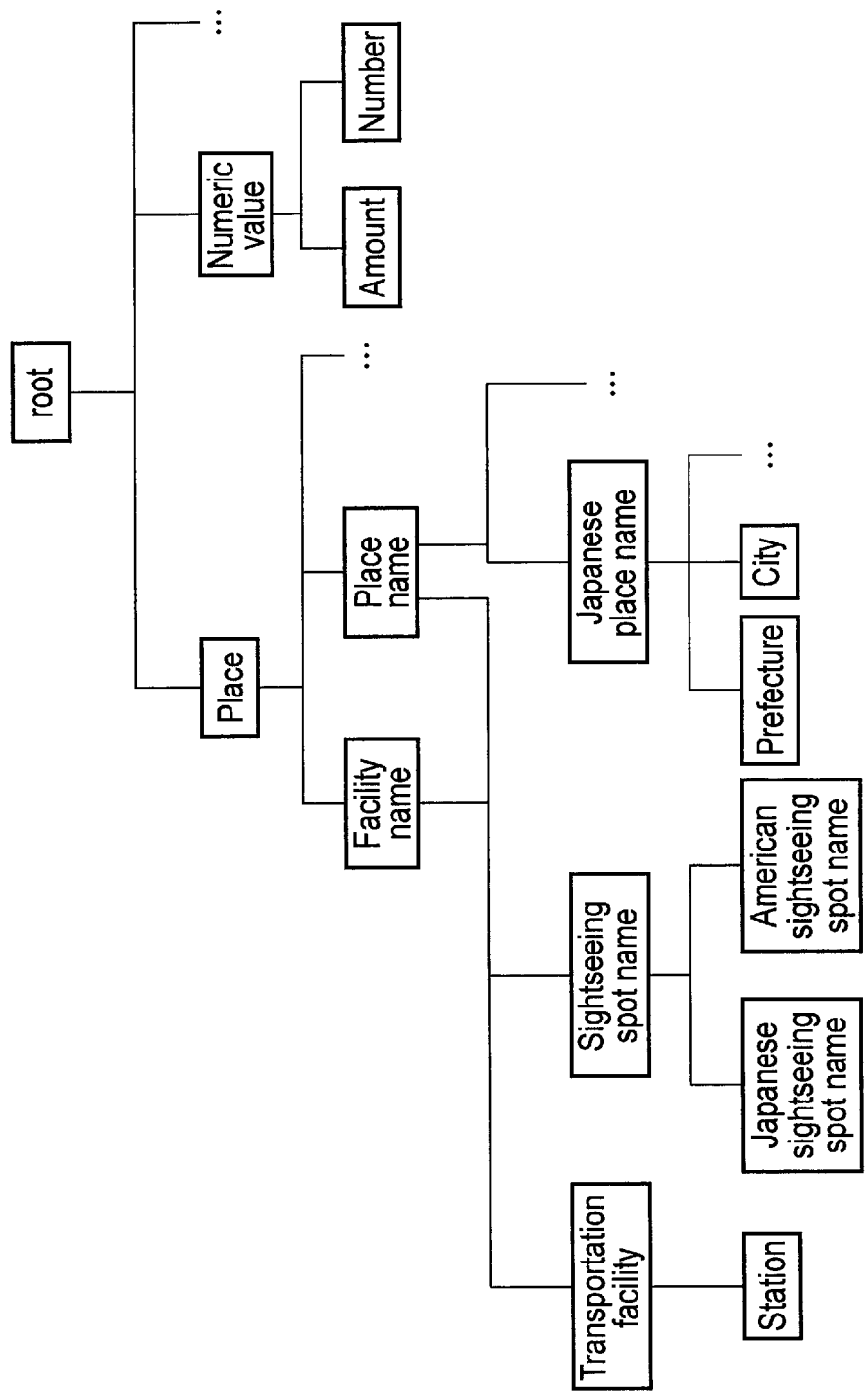
F I G. 5

| Input mode | Weight value |
|---|---|
| Voice input mode | 1.0 |
| Handwriting mode | 0.8 |
| Map mode | 0.5 |
| Option mode | 1.2 |
| Calculator mode | 1.2 |
| ⋮ | ⋮ |

91

F I G. 9

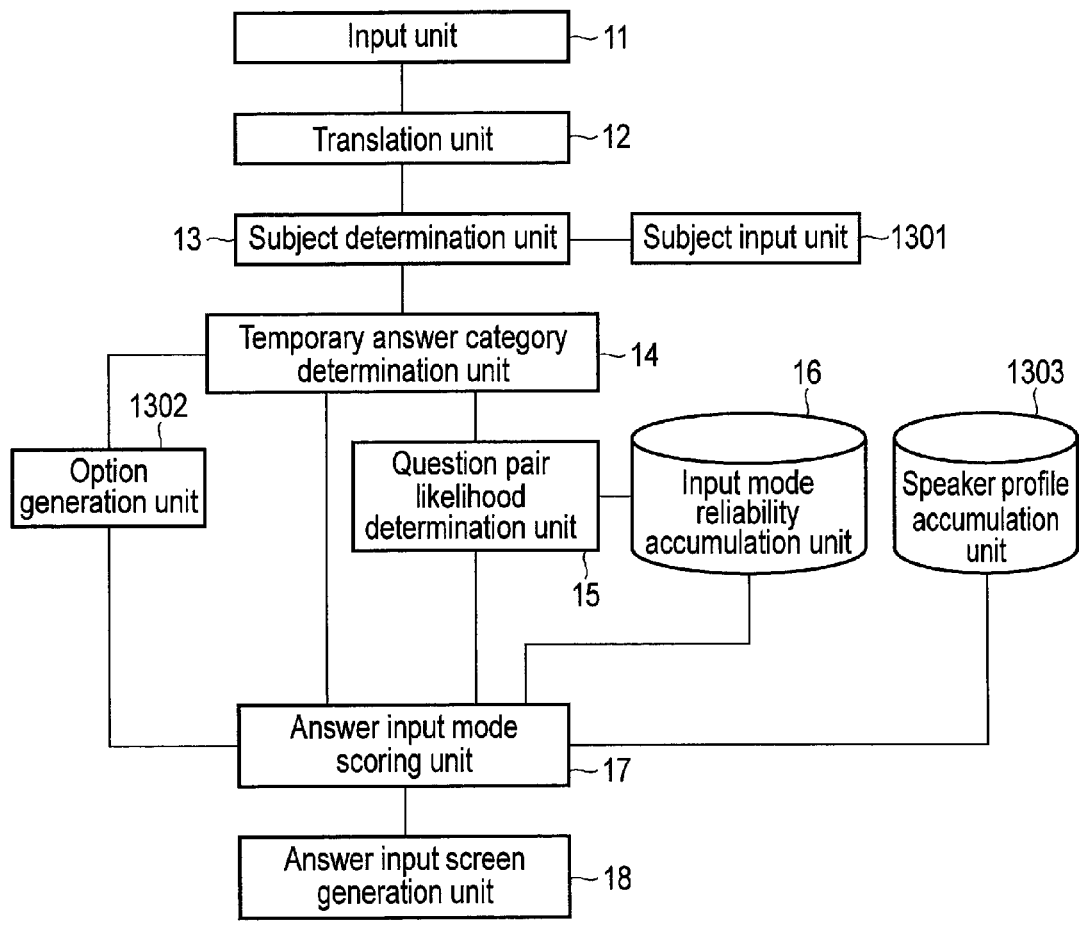
F I G. 15

| User | Position | Language | Sex | Age |
|---|---|---|---|---|
| 0 | Shop assistant | Japanese | Female | 20~29 |
| 1 | Customer | American English | Male | 30~39 |
| ⋮ | ⋮ | ⋮ | ⋮ | |

| Temporary answer category | Additional subject keyword | Option |
|---|---|---|
| Japanese sightseeing spot name | Asobu | Tokyo sukaitsuri |
| | | Kokyo |
| | | Sensoji |
| | | Ueno dobutsuen |
| | Kaimono | Akihabara denkigai |
| | | Ameyoko |
| | | ⋮ |
| | ⋮ | ⋮ |
| ⋮ | ⋮ | |

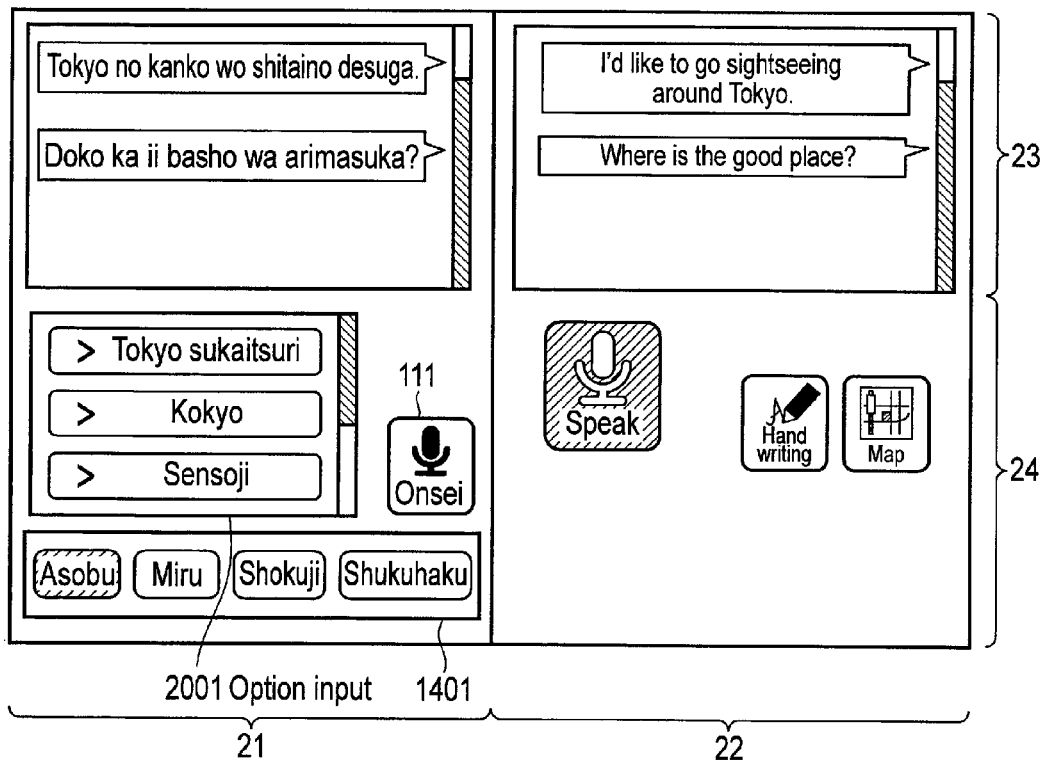
F I G. 20

VOICE CONVERSATION SUPPORT APPARATUS, VOICE CONVERSATION SUPPORT METHOD, AND COMPUTER READABLE MEDIUM

CROSS-REFERENCE TO RELATED APPLICATIONS

This application is based upon and claims the benefit of priority from the prior Japanese Patent Application No. 2014-025902, filed Feb. 13, 2014, the entire contents of which are incorporated herein by reference.

FIELD

Embodiments described herein relate generally to a voice conversation support apparatus for supporting two or more users to have a conversation using an input means such as handwriting input in addition to voice input, a voice conversation support method, and a computer readable medium.

BACKGROUND

When people who do not understand the language of one another have a conversation, an interpreter needs to listen and translate a content uttered by a speaker. It is, however, very difficult to always prepare an interpreter, and speakers who do not understand the language of one another cannot have a conversation.

To solve this problem, there is provided a voice translation technique of converting an uttered voice into text using a voice recognition technique, translating the text into the language of a listener by machine translation, and displaying the translated text or reproducing a voice using a voice synthesis technique.

There is also provided a support technique in which even if people who use the same language have a conversation when one person is at a remote location such as a call center, a voice is converted into text by voice recognition and data to be recorded are automatically acquired.

In the above-described voice translation/voice conversation support technique, the accuracy of voice recognition is limited, a content different from that uttered by the user may be converted into text. If the incorrect voice recognition result is translated, an intention is not transmitted to the partner user, thereby disabling a conversation from being held.

Since a question and an answer to it are often repeated in a conversation between people, if a question sentence is prepared in advance, the questioning side may be able to solve the above problem.

Since, however, the answering side inputs an answer for the first time when the question is asked, the answering side cannot solve this problem. There is provided a method of inputting an answer using an alternative means such as a keyboard or handwriting input without using voice recognition. However, the user who is not familiar with an apparatus may make a mistake, and it takes time more than that for voice recognition. As a result, the user feels stress.

As described above, even if the user can transmit a short intention using the conventional voice translation/voice conversation support technique, it is difficult to smoothly continue a conversation.

BRIEF DESCRIPTION OF THE SEVERAL VIEWS OF THE DRAWINGS

FIG. 3 is a table showing an example of a dictionary of subject keywords and words belonging to each subject keyword according to the first embodiment;

FIG. 4 is a table showing a list of sentence patterns for input sentences according to the first embodiment;

FIG. 5 is a view showing an example of a category tree for holding categories in a tree structure according to the first embodiment;

FIG. 9 is a table showing an example of a weight value held for each input mode according to the first embodiment;

FIG. 15 is a block diagram showing the arrangement of a voice conversation support apparatus according to the second embodiment;

FIG. 20 is a view showing an example of a screen for presenting options generated by an option generation unit for a question according to the second embodiment.

DETAILED DESCRIPTION

In general, according to one embodiment, a voice conversation support apparatus includes an input unit, a first determination unit, a second determination unit, a third determination unit, a scoring unit, and a screen generation unit. The input unit accepts a text data input according to a voice input mode and another input mode. The voice input mode converts a voice uttered by the user into text data. Another input mode accepts an input operation from the user. The first determination unit extracts at least one subject keyword representing a current subject from the input sentence. The second determination unit extracts a question pair of a question sentence and an answer sentence by determining whether the input sentence is at least one of a question sentence and an answer sentence, and estimates a category of a word that can be an answer based on a format of the question sentence and the subject keyword, as a temporary answer category, when the input sentence is the question sentence. The third determination unit estimates a category of a answered content based on the answer sentence and calculates a question pair likelihood based on at least one of the temporary answer category and the answer category, when the question pair is obtained. The scoring unit calculates a score about a priority of each input mode based on the temporary answer category and the question pair likelihood. The screen generation unit displays the input modes in an order of the scores calculated by the scoring unit.

In each embodiment (to be described later), a case in which a voice conversation support apparatus is applied to the voice translation function of a terminal such as a tablet terminal including a touch screen will be explained.

Note that the voice conversation support apparatus is applicable to not only the voice translation function but also the work support function in a call center, and the like.

First Embodiment

The first embodiment will be described below with reference to the accompanying drawings.

In the first embodiment, a user who speaks Japanese and a user who speaks English commonly use one tablet terminal including a touch screen. A voice translation application to which a voice conversation support apparatus that allows a handwriting input operation of inputting characters by writing them by a finger on the screen in addition to an input operation by voice recognition is applied will be described.

Note that a combination of languages is not limited to the above one, and any languages that can be supported by individual parts such as voice recognition and translation may be used.

(Overall Arrangement)

A voice conversation support apparatus according to the first embodiment translates a content input by the user and presents it in a text format to the partner user. Note that it is possible to perform voice synthesis of the translation result, and output the result as a voice.

Figure 1:
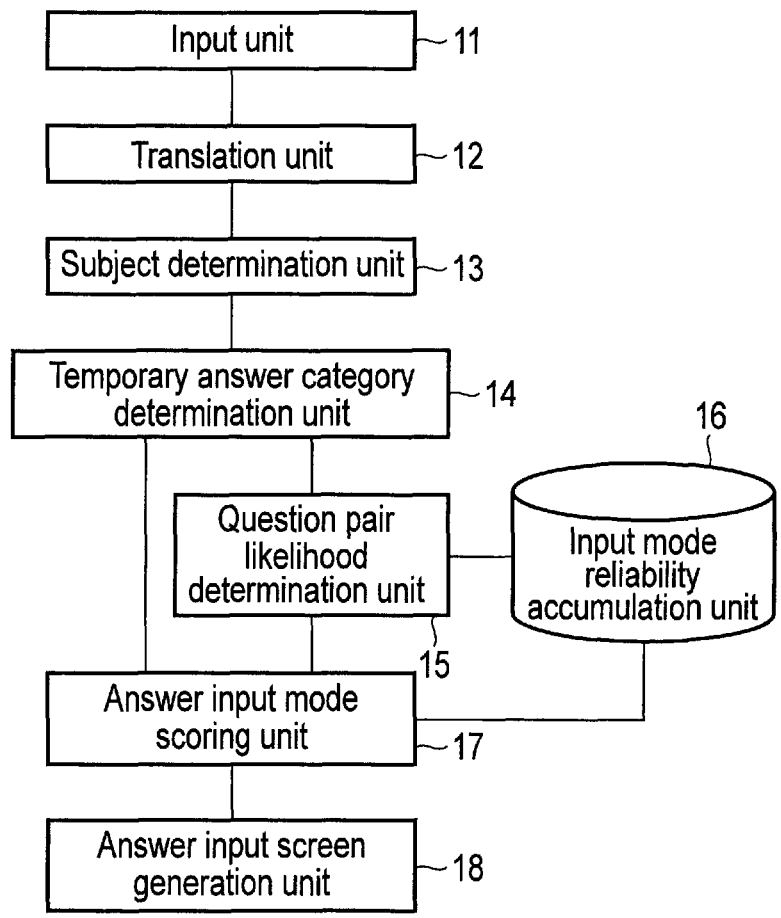
FIG. 1 is a block diagram showing an example of a voice conversation support apparatus according to the first embodiment.

FIG. 1 is a block diagram showing the arrangement of the voice conversation support apparatus according to the first embodiment.

The voice conversation support apparatus according to this embodiment includes an input unit 11, a translation unit 12, a subject determination unit 13, a temporary answer category determination unit 14 (hereinafter referred to as the category determination unit 14), a question pair likelihood determination unit 15 (hereinafter referred to as the determination unit 15), an input mode reliability accumulation unit 16 (hereinafter referred to as the accumulation unit 16), an answer input mode scoring unit 17 (hereinafter referred to as the scoring unit 17), and an answer input screen generation unit 18 (hereinafter referred to as the screen generation unit 18). The voice conversation support apparatus is constituted of a CPU, a ROM, a RAM and the like to control the translation unit 12, the subject determination unit 13, the category determination unit 14, the determination unit 15, the accumulation unit 16, the scoring unit 17, and the screen generation unit 18 of the voice conversation support apparatus by software processing.

The input unit 11 is an input device such as a microphone and touch screen (neither of which is shown), and is used by the user to input an uttered content using a microphone or another input mode. The translation unit 12 translates text data input using the input unit 11. The subject determination unit 13 extracts one or more subject keywords representing the current subject from an input sentence.

The category determination unit 14 estimates a temporary answer category based on the format of a question sentence and the subject keywords. The determination unit 15 estimates the category of an answered content based on an answer sentence, and calculates the likelihood of a question pair based on the temporary answer category or answer category. The accumulation unit 16 holds a reliability value for an input mode as a method of inputting a word in the temporary answer category.

The scoring unit 17 calculates a score about the priority of each input mode based on the temporary answer category, question pair likelihood, or input mode reliability. The screen generation unit 18 displays the input modes in the order of the scores of the respective answer input modes, which have been calculated by the scoring unit 17.

The voice conversation support apparatus can be mounted, as an application for voice translation, on a terminal including a microphone and screen. The microphone need not be equipped in the terminal, and an external microphone such as a headset microphone may be additionally used.

For example, a mobile terminal such as a smartphone or tablet, or a hardware apparatus such as a desktop or notebook type Personal Computer (PC) can be used.

The number of terminals to which the voice conversation support apparatus is applied need not be one. It is possible to apply the voice conversation support apparatus to a plurality of terminals by, for example, communicating input data or an input sentence.

(Screen Arrangement)

Figure 2:
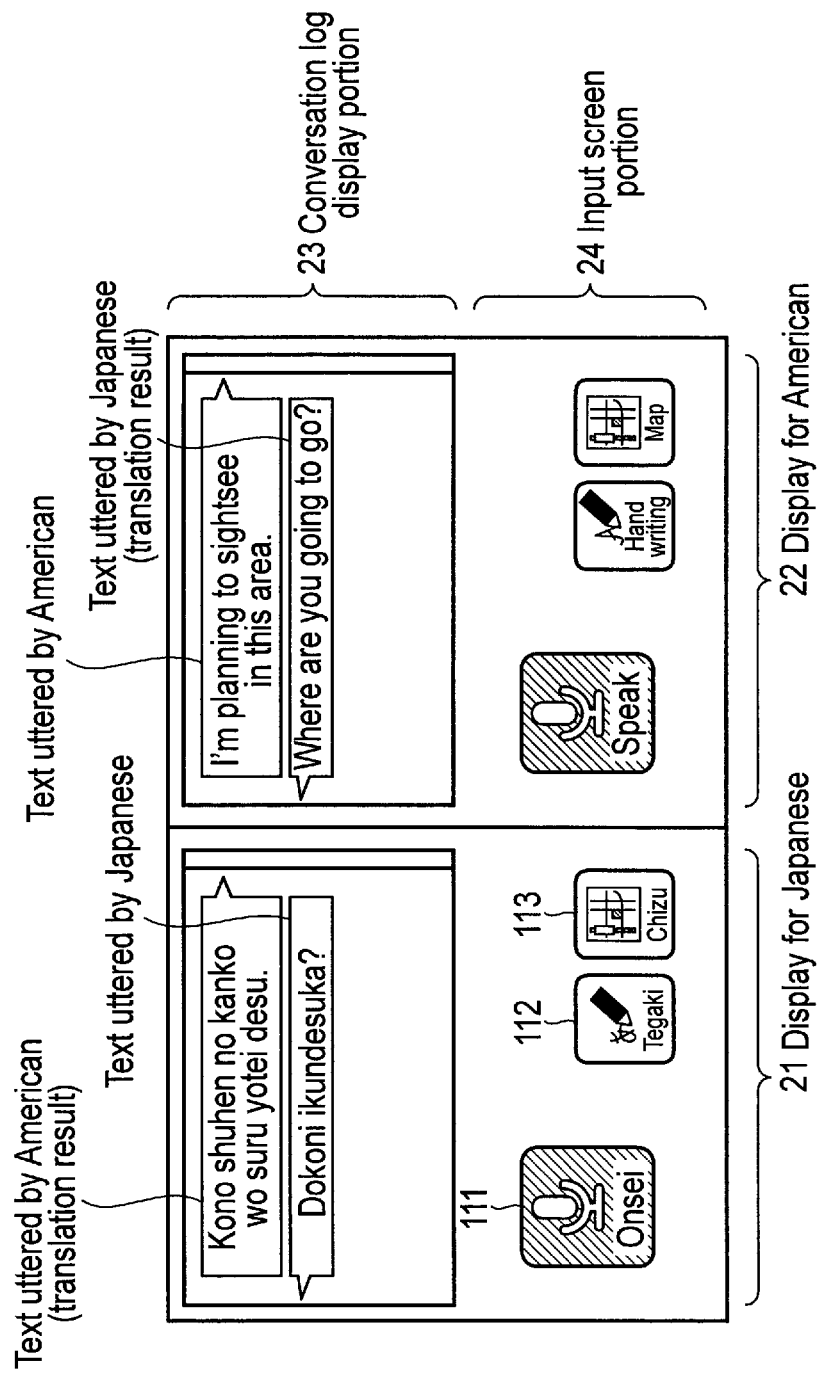
FIG. 2 is a view showing a screen of an example of the user interface of a voice translation application according to the first embodiment.

FIG. 2 shows an example of the screen of the voice translation application according to the first embodiment.

The screen is formed from a display 21 for Japanese and a display 22 for American each of which includes a conversation log display portion 23 and an input screen portion 24.

In the display 21 for Japanese, the result of translating a content uttered by an American and a content uttered by a Japanese are displayed as a conversation log. In the display 22 for American, the content uttered by the American and the result of translating the content uttered by the Japanese are displayed as a conversation log.

In the initial state, possible input modes (in this example, a voice input mode 111, a handwriting input mode 112, and a map input mode 113 using a drawing pointing mode) are displayed on each input screen portion 24, as shown in FIG. 2, and one of the input modes (in this example, the voice input mode) has been selected.

In this state, when the Japanese utters, the voice is recognized. As a result, recognition result text is displayed in the display 21 for Japanese as a conversation log, and translated result text is displayed in the display 22 for American as a conversation log.

(Details of Each Unit)

Details of each unit will be described below in the processing order.

(Input Unit)

The input unit 11 indicates a device, screen part, or function having a plurality of input modes. In the first embodiment, assume that the input unit 11 includes the voice input mode 111, the handwriting input mode 112, the map input mode 113, and a numeric keypad input mode. The listed input modes are merely examples, and the present invention is not limited to them. Any means used by the user to perform an input operation for a terminal can be used.

In the voice input mode 111, a voice uttered by the user is captured using a microphone device, a volume indicator or the like is displayed on the screen, and the result of converting the voice into text using the voice recognition function is acquired.

In the handwriting input mode 112, the pointing or gesture position of the user is received using a touch screen device, and the result of converting the position into text using the handwritten character recognition function is acquired.

In the map input mode 113, a map is displayed on the screen, the pointing position of the user is received using the touch screen device, and text such as the place name, building name, or the like of the touched position is acquired.

In the numeric keypad input mode, buttons are displayed like a calculator on the screen, the pointing position of the user is received using the touch screen device, and text corresponding to a touched number is acquired.

(Translation Unit)

The translation unit 12 translates the text input by the input unit 11 into the other language. The translated text is used as text to be displayed on the listener side of the screen (FIG. 2).

Any translation means may be used. It is possible to apply any methods such as a general transfer method, example-based method, statistical-based method, and intermediate language method used in the known machine translation techniques.

(Subject Determination Unit)

The subject determination unit 13 extracts one or more keywords representing the current subject from an input sentence. These keywords will be referred to as subject keywords.

A target sentence may be a sentence itself input by the input unit 11, or the translation result of the translation unit 12. Also, it is possible to extract a subject keyword from both the input sentence and the translation result, and calculate the AND or OR of them.

In this example, assume that when a sentence in Japanese is input, a subject keyword is extracted from the input sentence intact, and when a sentence in English is input, a subject keyword is extracted from the translation result of the sentence.

As a practical method of extracting a subject keyword, for example, a method can be used in which fixed words are held in a dictionary, and a word in a sentence, that matches one of the words held in the dictionary, is extracted.

FIG. 3 shows an example of a dictionary 31. The dictionary 31 associates, with each other, a subject keyword and words belonging to it. As the indices of the dictionary 31, a word character string may be used as shown in FIG. 3, or a regular expression may be used.

If, for example, the above-described method is applied to the conversation shown in FIG. 2, the input sentence is "I'm planning to sightsee in this area.", and the translation result of the input sentence is "Kono shuhen no kanko wo suru yotei desu." By comparing the translation result with the subject keyword dictionary, it is found that "kono shuhen" and "kanko" are held as belonging words. Therefore, "shuhen" and "kanko" are extracted as subject keywords.

As another method, for example, a method of extracting a characteristic noun phrase in a sentence group using an existing technique such as morphological analysis or tf·idf, or a method of extracting a proper noun using a well-known named entity extraction method, and determining its semantic attribute can be used. Note that tf·idf is a technique of multiplying the appearance frequency tf of a word in one document having related information and the inverse idf of a measure representing how many documents of all documents include the word.

Furthermore, in a well-known subject division method, a method of comparing words included in text and automatically detecting a break of a subject is disclosed. It is possible to extract a word using this method.

Note that the holding period of a subject keyword need only be a period until a predetermined number of sentences are input after a sentence in which the subject keyword is input or a period until a predetermined time elapses. Alternatively, the above-described subject division method may be used to clear the subject keyword for each subject break.

(Temporary Answer Category Determination Unit)

The category determination unit 14 determines whether the input sentence is a question sentence or answer sentence. If there are a question sentence and an answer sentence immediately after the question sentence, the category determination unit 14 extracts the combination of sentences as a question pair.

(Question Sentence Pattern Determination)

Whether the input sentence is a question sentence is determined using a known method of determining the sentence pattern of a question sentence. The category determination unit 14 determines which of sentence patterns 41 shown in FIG. 4 corresponds to the input sentence. If a question sentence pattern is determined, the input sentence can be determined as a question sentence; otherwise, the input sentence is not determined as a question sentence. Furthermore, if the input sentence being processed is immediately after a question sentence, the input sentence can be determined as an answer sentence.

For example, in the case of a question sentence "Dokoni ikundesuka?" shown in FIG. 2, the format of the question sentence is "where".

(Estimation of Temporary Answer Category from Question Sentence)

Furthermore, if the input sentence is a question sentence, the category determination unit 14 estimates a temporary answer category based on the format of the question sentence and the subject keywords extracted by the subject determination unit 13. The temporary answer category is the category of a word assumed as an answer. For example, the semantic attribute of the word is used as a category.

The category determination unit 14 has categories managed in a tree structure or network structure. FIG. 5 shows an example of a category tree (in fact, the categories are managed by not a tree but tags).

For example, in the case of the question sentence "Dokoni ikundesuka?" shown in FIG. 2, the format of the question sentence is "where" (place) and the subject keywords are "shuhen (this keyword is developed depending on the place where the system is implemented, and may be, for example, "Japan" or the like)" and "kanko". Therefore, a subtree associated with the place is extracted from the category tree, and a category is searched for by "Japan" and "kanko". Consequently, "Japanese sightseeing spot name" is obtained as a temporary answer category.

Note that if the sentence pattern of the question sentence is "Yes/No", "Yes" or "No" is assumed as an answer, and thus no temporary answer category is obtained.

(Question Pair Likelihood Determination Unit)

When it is determined that the input sentence is an answer sentence, the determination unit 15 estimates the category of an answer content based on the answer sentence.

By comparing the temporary answer category obtained based on the question sentence with the answer category estimated based on the answer sentence, the likelihood of the question pair, that is, an index indicating the accuracy of the correspondence of the question pair is calculated.

Figure 6:
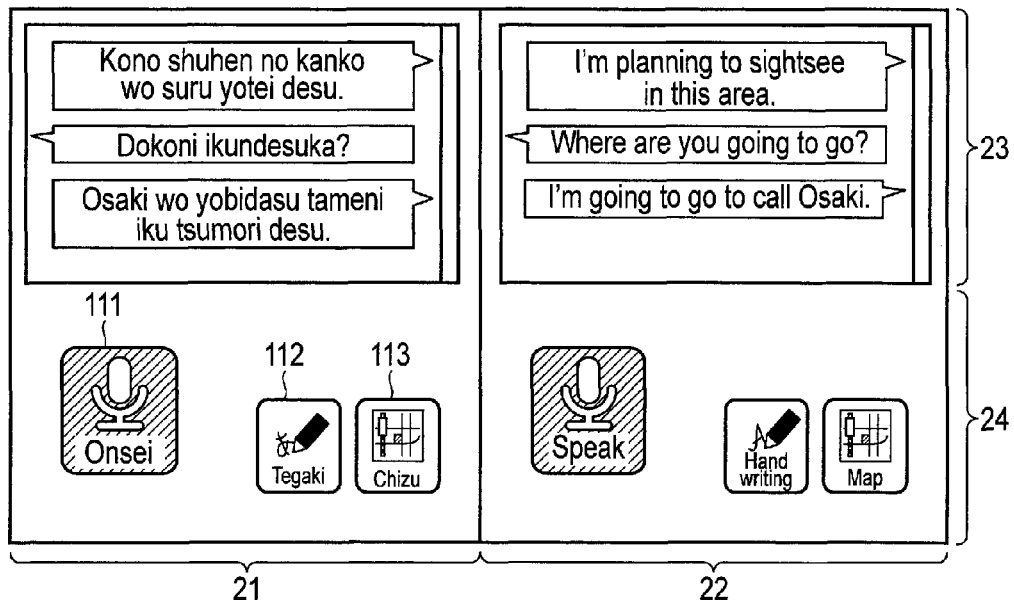
FIG. 6 is a view showing an example of a screen when the user inputs an answer sentence according to the first embodiment.

In the example shown in FIG. 2, assume that after the question, the American answers "I'm going to Kawasaki." using the voice input mode, and the answer is erroneously recognized as "I'm going to go to call Osaki." by voice recognition. In this case, the screen is as shown in FIG. 6, and "I'm going to go to call Osaki." is obtained as an answer sentence.

The question pair includes (question) "Dokoni ikundesuka" and (answer) "I'm going to go to call Osaki.", and the temporary answer category is "Japanese sightseeing spot name", as described above. The determination unit 15 obtains the accuracy of the answer sentence for the question sentence.

(Example of Necessary Table)

Figure 7:
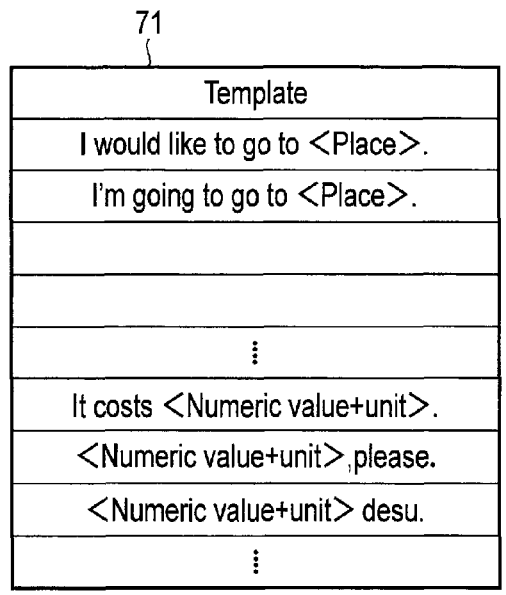
FIG. 7 is a table showing an example of an answer template dictionary for identifying an answer portion of an answer sentence according to the first embodiment.

The determination unit 15 has an answer template dictionary 71 shown in FIG. 7.

The answer template dictionary 71 is a dictionary for holding, as a template with a blank, a sentence that can be an answer sentence. A portion bracketed by symbols < and > in FIG. 7 indicates a blank portion. In the blank portion, a category name (or a combination of categories) is described. The blank portion corresponds to an answer in the answer sentence.

For example, a template "I would like to go to <place>." indicates that "Kawasaki" or "the toilet" in an answer sentence "I would like to go to Kawasaki." or "I would like to go to the toilet." is an answer content that the answerer wanted to answer.

(Question Pair Likelihood Calculation Method)

Figure 8:
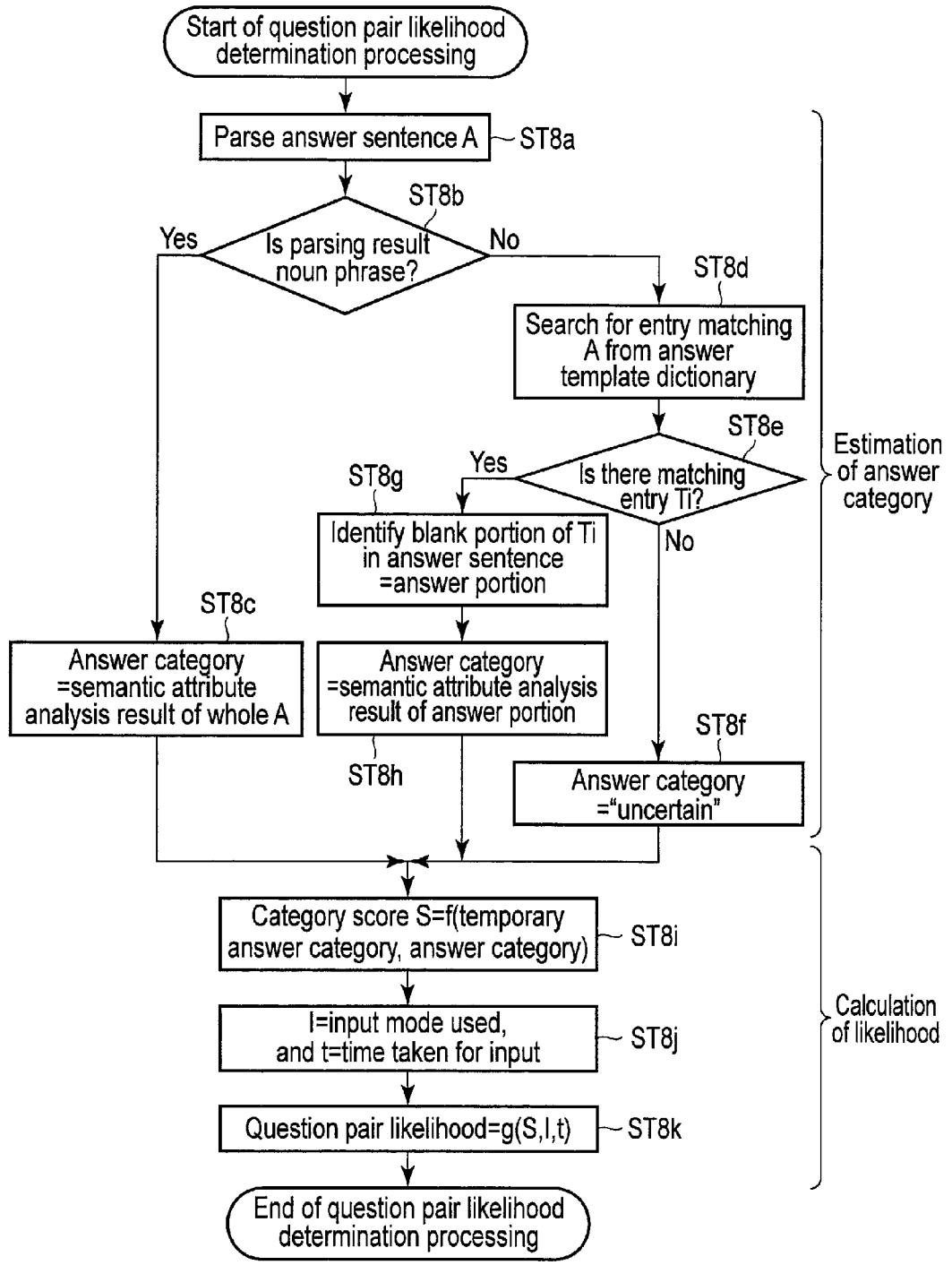
FIG. 8 is a flowchart illustrating the processing procedure of a question pair likelihood determination unit according to the first embodiment.

FIG. 8 is a flowchart illustrating a practical method of calculating the likelihood of a question pair by the determination unit 15.

A method of calculating the likelihood of a question pair will be described below according to FIG. 8.

When an answer sentence is obtained, the determination unit 15 estimates an answer category. The determination unit 15 parses the answer sentence (step ST8$a$), and determines whether the result indicates a noun phrase (step ST8$b$). If a noun phrase is indicated (YES), the determination unit 15 analyzes the semantic attribute of the whole answer sentence (step ST8$c$). The semantic attribute analysis result indicates the answer category. For example, if the answer sentence is "Kawasaki City.", the answer category is "Japanese place name (city)".

If the parsing result indicates in step ST8$b$ that the answer sentence is not a noun phrase (NO), the determination unit 15 searches the answer template dictionary 71 for a template matching the answer sentence (step ST8$d$), and determines whether there is a matching template (entry Ti) (step ST8$e$). If no matching template is found (NO), the determination unit 15 cannot specify the answer category, and obtains "uncertain" (step ST8$f$).

If a matching template is found in step ST8$e$ (YES), the determination unit 15 identifies a position in the answer sentence, which corresponds to the blank portion of the template (step ST8$g$). For example, if a search is performed using the exemplary answer sentence "I'm going to go to call Osaki.", "I'm going to go to <place>." is obtained, and "call Osaki" matches the blank portion (<place>) of the template, and is an answer portion.

The determination unit 15 analyzes the semantic attribute of the obtained answer portion (step ST8$h$). The thus obtained result indicates an answer category. In the above example, "call Osaki" is not a noun phrase but a verb phrase. Consequently, the answer category is "verb phrase".

After the answer category is obtained in this way, the determination unit 15 calculates a category score S based on f (temporary answer category) (step ST8$i$). Note that the equation f is configured to have a larger value as the distance between the temporary answer category and the answer category is shorter, and have a smaller value as the distance is longer. As a simple method, a predetermined value is used as a category score S. If the categories completely coincide with each other, a predetermined value $S_a$ is used. If the temporary answer category and the answer category have a hierarchical relationship on the category tree (for example, "place name" and "Japanese place name", "Japanese place name" and "Japanese sightseeing spot name", or the like), a predetermined value $S_b$ is used. If the categories have no relationship, a predetermined value $S_c$ is used. If the answer category is "uncertain", a predetermined value $S_d$ is used. Note that $S_a \geq S_b \geq S_c \geq S_d$. Another method of, for example, determining a category score depending on a difference in depth with respect to the hierarchical relationship may be used.

After calculating the category score, the determination unit 15 acquires an input mode I used to input the answer sentence, and a time t taken to input the answer (step ST8$j$), and calculates the question pair likelihood using the category score S, the input mode I, and the time t taken to input the answer (step ST8$k$).

The question pair likelihood is obtained according to a function g(S, I, t) with arguments S, I, and t. The function g(S, I, t) is desirably a monotone increasing function with respect to the argument S and a monotone decreasing function with respect to the argument t. As shown in FIG. 9, for example, the determination unit 15 has a weight value table 91 for the respective input modes, and can use an equation g(S, I, t)=S×$w_I$×1/t by acquiring a weight value w for the input mode I from the weight value table 91.

Note that when the time taken to input the answer is not used to calculate the question pair likelihood, the determination unit 15 need only use the category score as the question pair likelihood intact.

For example, in the above-described example when $S_a$=1.0, $S_b$=0.8, $S_c$=0.2, and $S_d$=0.0, "call Osaki" is a verb phrase. The answer category is thus estimated as "verb phrase". The temporary answer category is "Japanese sightseeing spot name", and has no hierarchical relationship with "call Osaki". Therefore, a value s=0.1 is used as the category score. Since the input mode is the voice input mode, if the weight value is $w_I$=1.0 and the time taken to input the answer is t=2.0 sec, the question pair likelihood is 0.2×1.0×1/2.0=0.1.

(Input Mode Reliability Accumulation Unit)

The accumulation unit 16 holds, for each user, a value indicating the reliability of each input mode as a method of inputting a word of each category. This value is used to learn the value of the question pair likelihood, and used for answer input mode scoring in a "state in which no answer is input" (to be described later).

(Data Content)

Figure 10:
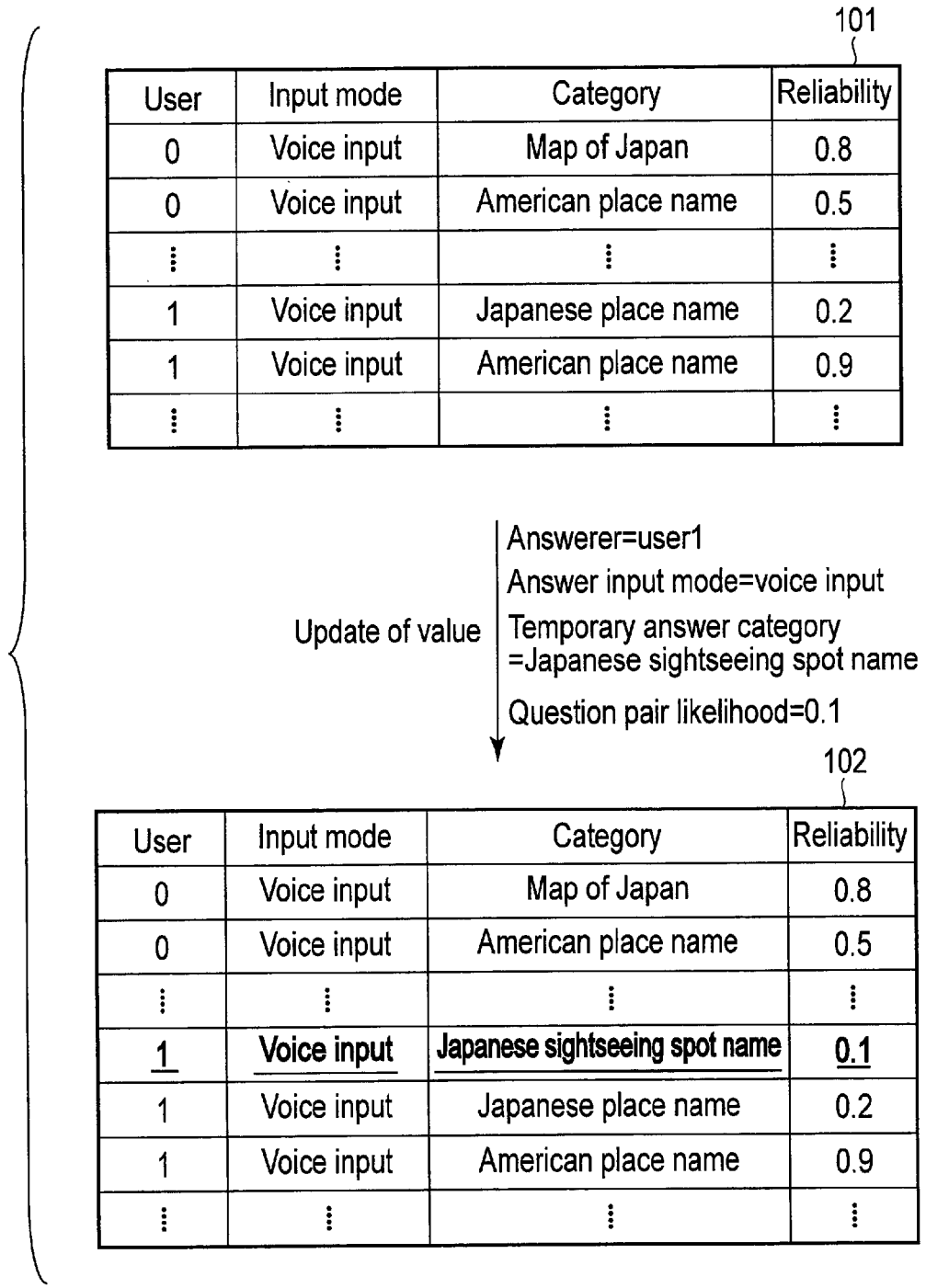
FIG. 10 is a view showing an example of data accumulated in an input mode reliability accumulation unit according to the first embodiment.

Data accumulated by the accumulation unit 16 is as indicated by a table 101 shown in FIG. 10. The table 101 holds a user number, an input mode, and the reliability for each word category. As for a category and input mode for which no data exits, the table is empty.

(Update of Value)

The determination unit 15 updates the value in the accumulation unit 16. In the accumulation unit 16, after calculating the question pair likelihood, the determination unit 15 searches for a corresponding record based on the user who has input the answer, the mode in which the answer has been input, and the temporary answer category obtained based on the question sentence, and updates the reliability value of the record using the question pair likelihood. If there is no record, a new record is created and values are input.

The reliability value may be overwritten with the question pair likelihood itself, or the weighted sum of the original value and the reliability likelihood or the like may be used to avoid the value from suddenly changing. A table 102 shown in FIG. 10 is an example of the updated table.

(Answer Input Mode Scoring Unit)

The scoring unit 17 calculates the score of the priority of each input mode of the input unit 11 using the user who has answered, the temporary answer category estimated by the category determination unit 14, and the question pair likelihood calculated by the determination unit 15 or the reliability value accumulated in the accumulation unit 16.

When it is determined that the answer sentence has been input, the scoring unit 17 calculates a score using the question pair likelihood calculated by the determination unit 15. Simply, the question pair likelihood may be used as the score of the input mode intact.

In the example shown in FIG. 6, for example, since the answer input mode is the voice input mode and the question pair likelihood is 0.1, the score of the voice input mode is set to 0.1.

(Answer Input Screen Generation Unit)

The screen generation unit 18 generates and displays an answer input screen based on the scores of the respective answer input modes calculated by the scoring unit 17. If the user has answered and the score calculated by the scoring unit 17 is low (lower than a predetermined threshold), it is determined that the user has failed to input the answer and a screen for prompting the user to answer again is presented.

Figure 11:
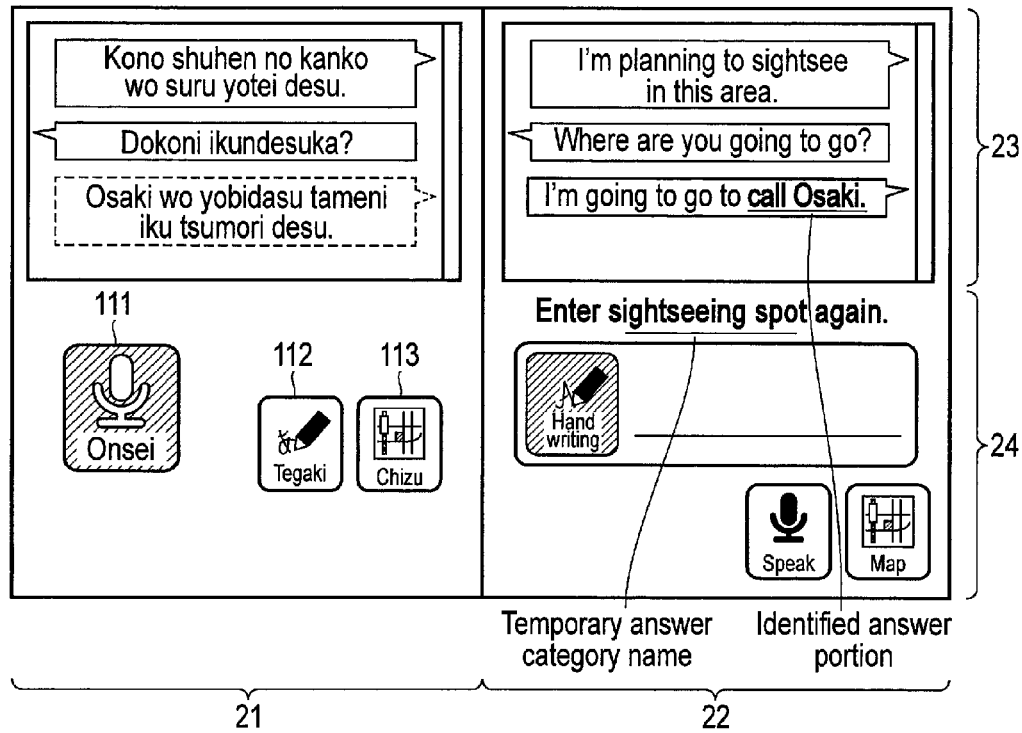
FIG. 11 is a view showing an example of a screen for prompting the user to answer again according to the first embodiment.

FIG. 11 shows an example of the screen for prompting the user to answer again. In this example, since the score of the voice input mode is low, the answering user is prompted to re-input the answer in a handwriting input mode as an alternative means. If a corresponding record of the answering user, input mode, and temporary answer category exists in the accumulation unit 16, the screen generation unit 18 selects, as alternative means to be used, a given number of input modes (a predetermined number of input modes or the number of input modes that can fit in the screen) in the descending order of the values. The input mode having the largest value is set in a selected state by default, and the remaining input modes are displayed as small icons. Alternatively, the sizes of the icons may be changed depending on the values.

If there is no corresponding record or if the reliability value of the input mode is not accumulated, a given number of predetermined input mode orders (for example, voice input→handwriting input→ . . . ) need only be used. In this case, instead of displaying the remaining input modes as the small icons as shown in FIG. 11, a method of, for example, setting the remaining input modes in a non-display state can be adopted.

For an operation of re-inputting the answer as well, the determination unit 15 calculates the likelihood, and updates the data in the accumulation unit 16.

(Processing When No Answer Sentence Is Input Yet)

The above-described processing by the scoring unit 17 and the screen generation unit 18 is processing when an answer sentence is input and a question pair is obtained. When the category determination unit 14 determines that a question sentence is input and no answer sentence is input yet, the following processing is performed. Note that in an embodiment wherein no accumulation unit 16 is included, this processing is not performed.

(Answer Input Mode Scoring Unit)

The scoring unit 17 checks whether a record of the estimated temporary answer category and the user who has answered exits in the accumulation unit 16. If a correspondence record exists, a score is calculated using the value accumulated in the accumulation unit 16 without waiting for the input of an answer sentence. As a practical score, the value accumulated in the accumulation unit 16 need only be used intact for the sake of simplicity.

For example, a case in which after the question and answer are input as shown in FIG. 6, a question "Hoka ni doko ka ikimasuka?" is input will be explained. The question sentence pattern of the question sentence "Hoka ni doko ka ikimasuka?" is "where", and the subject keyword remains the same as before. Therefore, the temporary answer category is "Japanese sightseeing spot name" that is the same as that of the preceding question sentence. Since the answering user is also the same user, a correspondence record exists in the accumulation unit 16 for the temporary answer category. By referring to the table 102 of FIG. 10, the score of the voice input mode is 0.1 and the score of the handwriting input mode is 0.5.

(Answer Input Screen Generation Unit)

In a state in which only a question is input and no answer is input yet, when the scoring unit 17 calculates a score, the screen generation unit 18 generates a screen to be used by an answering user to input an answer in accordance with the score calculated by the scoring unit 17.

Figure 12:
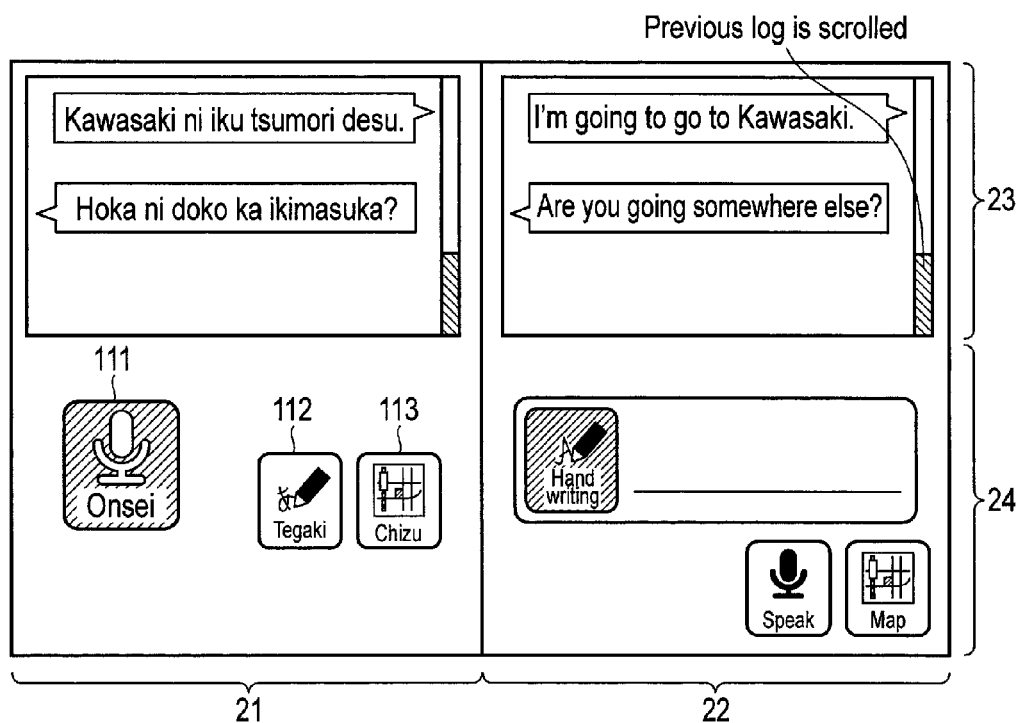
FIG. 12 is a view showing an example of a screen for answering in a handwriting input mode when a question of the same temporary answer category as that of a question asked before is input according to the first embodiment.

FIG. 12 shows an example of the screen in the handwriting input mode 112. In this case, instead of prompting the user to answer again, the handwriting input mode 112 that is considered as an optimum mode to input a "Japanese sightseeing spot name" is in a selected state by default.

Figure 13A:
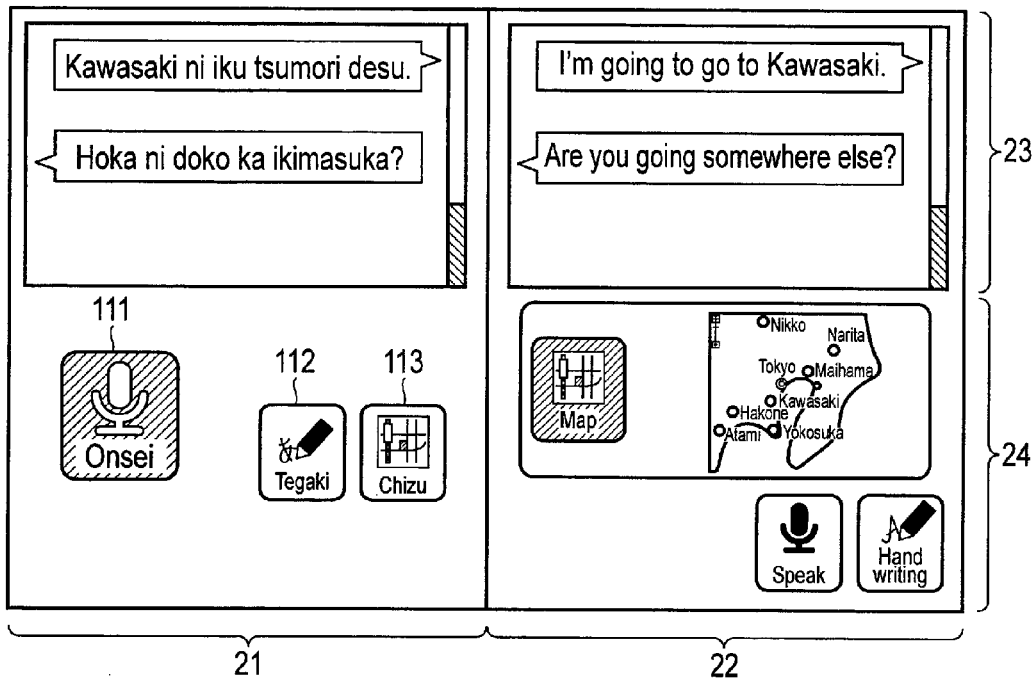
FIG. 13A is a view showing an example of a screen for answering in a map input mode when a question of the same temporary answer category as that of a question asked before is input according to the first embodiment.
Figure 13B:
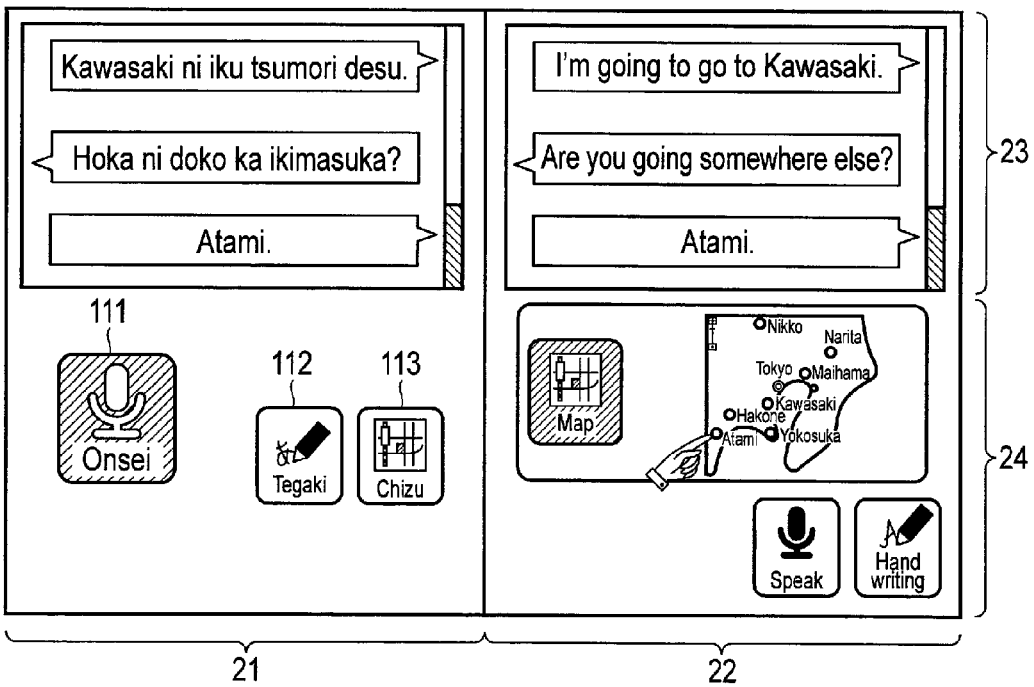
FIG. 13B is a view showing an example of the screen for answering in the map input mode after an answer to the question is input according to the first embodiment.

FIGS. 13A and 13B each show an example of the screen in the map input mode 113. In this case, the map input mode 113 that is considered as an optimum mode to input a "Japanese sightseeing spot name" is in a selected state by default.

In the example shown in FIG. 13A, assume that after the American answers "I'm going to go to Kawasaki." in the voice input mode 111, the Japanese inputs a question "Hoka ni doko ka ikimasuka?" in the voice input mode 111. In this case, on the input screen portion 24 of the display 22 for American, at least part of "Japan" or "Kanto area" centered on "Kawasaki" is displayed in the map input mode 113.

As shown in FIG. 13B, assume that the American touches "Atami" after the question. Note that when the American touches "Atami" by a finger, a mark indicating "Atami" is displayed on the screen. In this case, text "Atami" is displayed as an answer sentence in the screen conversation log display portion 23 of the display 22 for American.

Figure 14A:
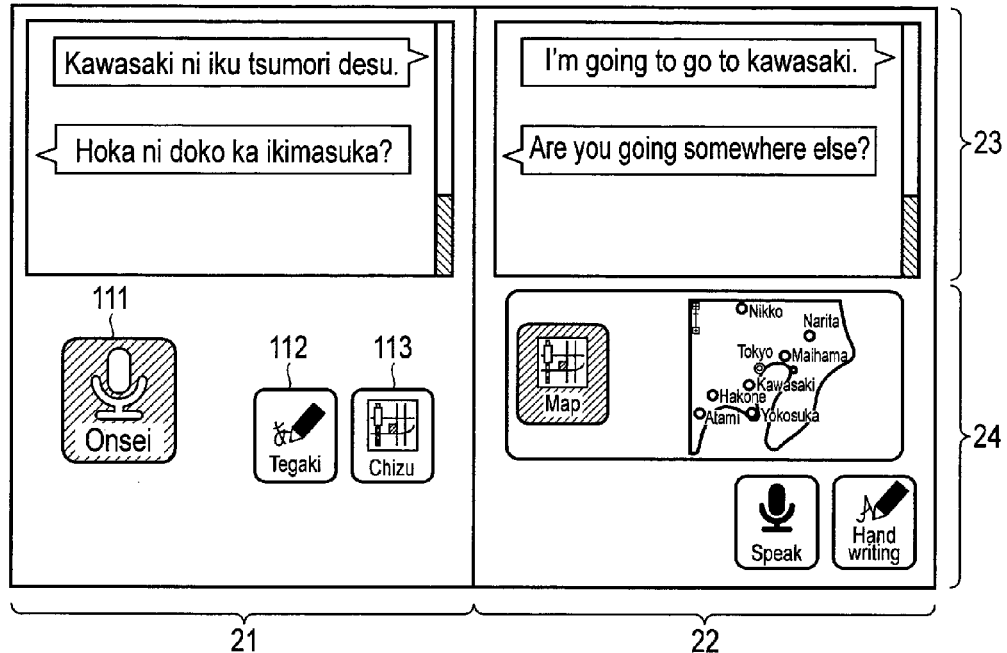
FIG. 14A is a view showing another example of the screen for answering in the map input mode when a question of the same temporary answer category as that of a question asked before is input according to the first embodiment.
Figure 14B:
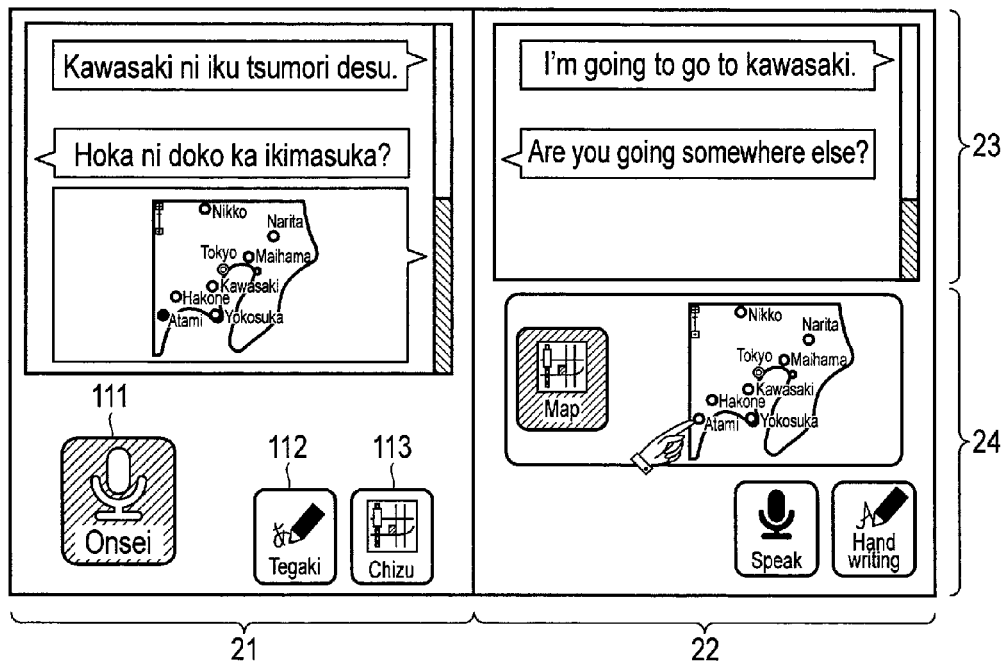
FIG. 14B is a view showing another example of the screen for answering in the map input mode after an answer to the question is input according to the first embodiment.

FIGS. 14A and 14B each show another example of the screen in the map input mode 113. In the example shown in FIG. 14A, assume that after the American answers "I'm going to go to Kawasaki." in the voice input mode 111, the Japanese inputs a question "Hoka ni doko ka ikimasuka?" in the voice input mode 111. In this case, on the input screen portion 24 of the display 22 for American, at least part of "Japan" or "Kanto area" centered on "Kawasaki" is displayed in the map input mode 113.

As shown in FIG. 14B, assume that the American touches "Atami" after the question by a finger. At this time, on the input screen portion 24 of the display 21 for Japanese, part of "Kanto area" centered on "Kawasaki" is displayed as an answer sentence, and "Atami" is displayed as a solid circle.

As for display in each of other alternative input modes, it is only necessary to perform the same processing as that when a screen for prompting the user to answer again is generated.

(Processing Procedure)

An actual processing procedure will be described with reference to an example of a question about a fee.

(When Conversation Other Than Question Is Held)

When a conversation without any question sentence is held, the system causes the translation unit 12 to translate an input sentence received by the input unit 11, and displays it. The subject determination unit 13 extracts subject keywords from the input sentence and translated sentence, and holds them.

Assume, for example, that a Japanese shop assistant and an American customer have a conversation about souvenirs using the voice conversation support apparatus installed in a Japanese shop. In this case, keywords such as "omiyage" (souvenir) associated with "kaimono" (shopping) are obtained as subject keywords.

(When Question and Answer Are Input)

When a question sentence is input, the category determination unit 14 estimates a temporary answer category based on the question sentence. For example, assume that an American inputs a question "How much is it?" about a given souvenir. Since the sentence pattern of this question is "How much" and a subject keyword is "kaimono", a temporary answer category is an amount.

If the Japanese side has never input an amount yet, the accumulation unit 16 stores no record of the temporary answer category, and the apparatus waits for the input of an answer sentence. When an answer sentence is input, the determination unit 15 estimates an answer category based on the answer sentence, and calculates the question pair likelihood. The determination unit 15 also updates a value in the accumulation unit 16 using the question pair likelihood.

Assume that the Japanese answers "500 (Gohyaku)-en desu." using the voice input mode, and the voice recognition technique causes a recognition error to input an answer sentence "Konnyaku-en desu." In this case, a portion "Konnyaku" is identified as an answer. As a result of semantic attribute analysis, an answer category is unwantedly determined as "food". Consequently, the question pair likelihood is low. The value of Japanese user/voice input/"amount" in the accumulation unit 16 is updated.

The scoring unit 17 calculates the score of the answer input mode based on the question pair likelihood. If the calculated score value is low, the screen generation unit 18 generates a screen for prompting the user to answer again using an alternative input mode. In the above example, the question pair likelihood is low, and the score of voice input/amount is low. Consequently, a screen for prompting the user to answer again using a numeric keypad as an alternative input mode is generated and presented.

When an answer is re-input and a new answer sentence is obtained, the determination unit 15 recalculates the question pair likelihood, and updates the values of the answer input mode and answer category in the accumulation unit 16. If an amount is correctly input using the numeric keypad, the question pair likelihood becomes high. Consequently, the value of Japanese user/numeric keypad/"amount" in the accumulation unit 16 is higher than that of Japanese user/voice input/"amount".

(When Question of Same Temporary Answer Category as Before Is Input and No Answer Is Input Yet)

When a question sentence is input and the accumulation unit 16 already stores a record of the temporary answer category, the scoring unit 17 calculates the score of each input mode without waiting for an answer sentence. The screen generation unit 18 generates a screen for inputting an answer based on the scores, and presents the screen to the answering user.

After the above example, when the American inputs a question "How much is it?" again about another product, the temporary answer category is "amount", and the accumulation unit 16 stores a record of Japanese user/numeric keypad/"amount" and a record of Japanese user/voice input/"amount". The score of the numeric keypad input mode is higher than that of the voice input mode, and thus the screen generation unit 18 generates an answer screen in which the numeric keypad input mode is selected by default, and presents the screen to the Japanese side. The Japanese user can input an amount using the numeric keypad without using the voice input mode with a high failure probability.

(Effects of First Embodiment)

As described above, according to the first embodiment, since an optimum answer input mode is presented according to a question and an actually input answer, the user can reliably input an answer, thereby allowing a smooth conversation.

Furthermore, once a failure occurs in a given answer input mode, its priority decreases. It is, therefore, possible to decrease the possibility that the same user repeats the same mistake.

Second Embodiment

The second embodiment will be described below with reference to the accompanying drawings by focusing attention on the difference from the first embodiment.

In the second embodiment, a voice translation application to which a voice conversation support apparatus is applied will be explained, similarly to the above-described first embodiment.

The difference from the first embodiment is to have a function of allowing the user to additionally, manually input a subject keyword, a function of, when a question sentence is input, automatically generating word options which can be answers, and presenting them to the user, and a function of holding information such as the position (for example, a customer or shop assistant), sex, and age of a speaker, and changing the priorities of answer input modes.

(Overall Arrangement)

FIG. 15 is a block diagram showing the arrangement of a voice conversation support apparatus according to the second embodiment. Note that in FIG. 15, the same reference numerals as those in FIG. 1 denote the same parts and a detailed description thereof will be omitted.

The voice conversation support apparatus according to the second embodiment includes a subject input unit 1301, an option generation unit 1302, and a speaker profile accumulation unit 1303 in addition to the components in the first embodiment.

The subject input unit 1301 presents a screen used by the user to input an additional subject, and provides an input additional subject keyword to a subject determination unit 13. When the category determination unit 14 determines a question sentence, the option generation unit 1302 generates options as answer candidates based on a temporary answer category. The speaker profile accumulation unit 1303 holds the position, used language, and sex of the user as speaker profile information.

Furthermore, the input unit 11 has an option input mode of presenting a plurality of options and accepting the selection input of the user. The scoring unit 17 calculates a score using the generated options and speaker profile in addition to scoring in the first embodiment.

(Screen Arrangement)

Figures 16, 17:
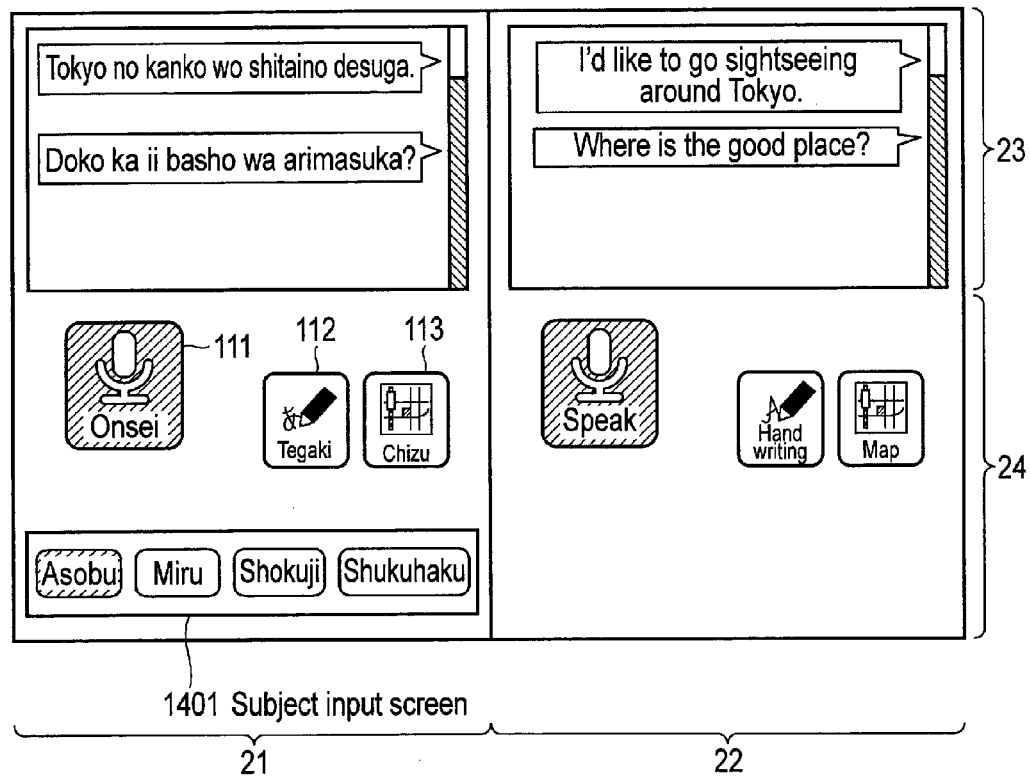
FIG. 16 is a view showing a screen of an example of the user interface of a voice translation application according to the second embodiment.
FIG. 17 is a table showing an example of data accumulated in a speaker profile accumulation unit according to the second embodiment.

FIG. 16 shows an example of the screen of the voice translation application according to the second embodiment.

In addition to the screen of the above-described first embodiment, a screen 1401 for inputting a subject on the display on the Japanese side is prepared. In this case, for example, "asobu" (play), "miru" (see), "shokuji" (meal), and "shukuhaku" (accommodation) are displayed on the screen 1401.

(Details of Each Unit)

(Input Unit)

In addition to the above-described first embodiment, an option input mode is included in the second embodiment.

The input unit 11 displays some options as buttons on the screen in the option input mode, acquires the pointing position of the user using a touch screen device, and acquires, as an input content, text displayed on the option of a touched button.

(Speaker Profile Accumulation Unit)

The speaker profile accumulation unit 1303 accumulates information about the position, age, and sex of each user. The position of the user indicates, for example, a customer or shop assistant in a shop. FIG. 17 shows an example of a speaker profile 1501 accumulated in the speaker profile accumulation unit 1303.

The speaker profile 1501 may be acquired by any method. In a shop in Japan, the position of a Japanese user is a shop assistant, and the position of an American user is a customer. The age and sex of the shop assistant can be input in advance, and the age and sex of the customer need only be input by the shop assistant at the start of a conversation. Alternatively, there is provided a method of estimating the age and sex based on voice information at the time of input of voice.

(Subject Input Unit)

The subject input unit 1301 presents a screen for allowing the user to input an additional subject keyword. In particular, assume that this function is provided to the user who takes an initiative in a conversation, such as a shop assistant in a conversation between the shop assistant and a customer. Assume also that the user to which the function is provided is determined by referring to a term "position" accumulated in the speaker profile accumulation unit 1303.

As a method of determining a subject that can be input, in addition to the method using the predetermined options as shown in FIG. 16, there is a method of allowing the user to input a preferred keyword, and a method using the history of subject keywords used in the past.

For example, in FIG. 16, "kanko" and "Tokyo" are extracted as subject keywords from only an input sentence. The Japanese user can select "asobu" through the subject input unit 1301. This intends to limit the subjects to sightseeing spot names in Tokyo, especially, interactive facilities such as a theme park instead of meals and the like.

The subject determination unit 13 determines subject keywords including the additional subject keyword input by the subject input unit 1301 in addition to the subject keywords extracted from the input sentence.

(Option Generation Unit)

Figures 18, 19:
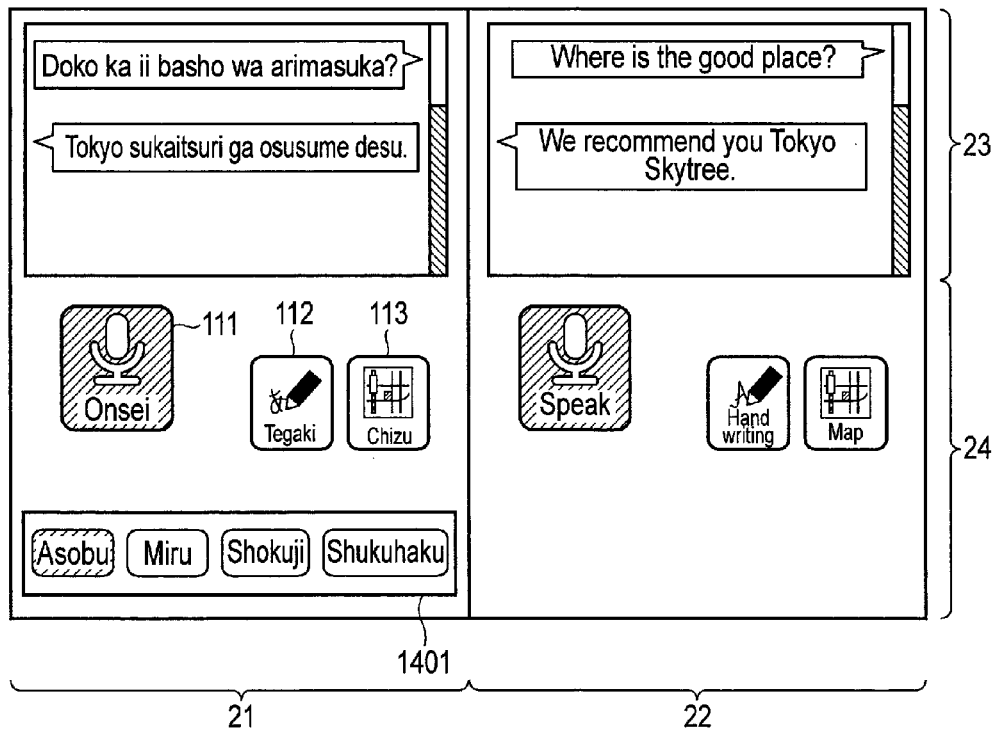
FIG. 18 is a table showing an example of a database storing options for each temporary answer category according to the second embodiment.
FIG. 19 is a view showing an example of a screen when the user answers a question by voice input according to the second embodiment.

When the category determination unit 14 determines an input sentence as a question sentence, the option generation unit 1302 generates, based on the sentence pattern, temporary answer category and subject keywords of the question sentence, options that can be answers. As a method of generating options, for example, a well-known technique used to generate an answer in a question answering system can be used. As a simple method, the option generation unit 1302 may prepare a database 1601 storing options for each temporary answer category, as shown in FIG. 18, and search the database 1601.

(Answer Input Mode Scoring Unit)

When a question sentence is input, and a corresponding record of answering user/temporary answer category exists in the accumulation unit 16 but there is no corresponding record of answering user/option input/temporary answer category, the scoring unit 17 calculates the score of the option input mode in a pseudo manner using the generated options.

The score calculation method is similar to the question pair likelihood calculation method. That is, $g(S, I, t) = S \times w_f \times 1/t$ in the first embodiment is used. Since options are generated based on the temporary answer category, the answer category of the options coincides with the temporary answer category, and thus a category score $S=S_a=1.0$ is obtained, thereby yielding $w_f=1.2$ from FIG. 9.

In fact, since no input operation has been performed yet in the option input mode, the time taken for an input operation is uncertain. Instead, it is expected that as the number of generated options is smaller, the time taken for selection is shorter, and as the number of options is larger, the time taken for selection is longer. Therefore, the value of t is decided in a pseudo manner according to the number of options.

Simply, if the number of options is smaller than a given threshold, $t=O_a$ is set. Alternatively, if the number of options is larger than the threshold, $t=O_b$ is set. Note that $O_a < O_b$ (for example, $O_a=2.0$ and $O_b=5.0$) may be set. That is, if the number of options is smaller than the threshold, the score is obtained according to $S_a \times w_f \times 1/O_a$.

Instead of the method of determining the threshold, an equation t=h (the number of options) according to the number of options may be used. For example, h (the number of options)=0.5×number of options+1.0 may be used.

Furthermore, the score is adjusted using the information accumulated in the speaker profile 1501. For example, the position is "shop assistant", the scores of the voice input mode and handwriting input mode in which a recognition error may occur are decreased. When the age is high, since a recognition error by voice recognition tends to occur, the score of the voice input mode is decreased, and the threshold of the number of options is changed.

(Processing Procedure)

A processing procedure will be described below with reference to the conversation example shown in FIG. 16.

For example, assume that the American has spoken "I'd like to go sightseeing around Tokyo. Where is the good place?". In response to this, the Japanese selects "asobu" by the subject input unit 1301. Subject keywords extracted by the subject determination unit 13 are "kanko", "Tokyo", and "asobu", and the category determination unit 14 determines that the question sentence pattern is "Where" and the temporary answer category" is "Tokyo sightseeing spot name".

The option generation unit 1302 searches the local database or information on the Web based on the content, and generates options of Tokyo sightseeing spot names. If a question of this sentence pattern and the temporary answer category is asked for the first time, the voice conversation support apparatus waits for the input of an answer sentence.

Assume that the Japanese inputs an answer sentence "Tokyo sukaitsuri ga osusume desu" using the voice input mode. Assume also that the answer is correctly recognized by voice recognition, and it takes 2.0 sec to input the answer.

Since the temporary answer category coincides with the answer category, the question pair likelihood is $1.0 \times 1.0 \times 1/2.0 = 0.5$ according to $S_a=1.0$, $w_f=1.0$, and $t=2.0$. Furthermore, since the position of the answering user is "shop assistant" with reference to FIG. 15, the score of the voice input mode further decreases, resulting in 0.45. The same applies to the value of Japanese user/voice input/"Tokyo sightseeing spot name" in the accumulation unit 16. Since the likelihood is higher than a threshold, the user is not prompted to answer again. FIG. 19 shows an example of a screen at this time.

Assume that a different American asks the same Japanese the same question. In this case, a record of Japanese user/voice input/"Tokyo sightseeing spot name" already exists in the accumulation unit 16, and has a value of 0.45.

Note that the option generation unit 1302 has generated options as described above, and the number of options is smaller than a specific threshold. The scoring unit 17 calculates the score of the option input mode by the above-described method.

That is, the score of the option input mode is $1.0 \times 1.2 \times 0.5 = 0.6$ according to $S_a=1.0$, $w_f=1.2$, and $O_a=2.0$. Since the score of the option input mode is higher than that of the voice input mode, the screen generation unit 18 generates an option input screen 2001 using the options, and presents it to the user. FIG. 20 shows an example of the screen at this time.

When the user inputs an answer in the screen, the determination unit 15 calculates the question pair likelihood, and a new record of Japanese user/option input/"Tokyo sightseeing spot name" is added to the accumulation unit 16.

At this time, a value obtained by considering the time actually taken to input the options is added. If it takes time to input the answer, when the same question is asked next, the voice input screen is presented.

(Effects of Second Embodiment)

As described above, according to the second embodiment, in addition to the above-described first embodiment, the user can input an answer by only selecting an answer from an appropriate number of options instead of inputting an individual answer, thereby allowing a smoother conversation.

Furthermore, since the user such as a shop assistant who takes initiative in a conversation can select a subject keyword, it is possible to further narrow the options, and limit an answer to information the user wants to recommend.

Other Embodiments

According to each of the aforementioned embodiments, since an optimum answer input mode is presented according to a question and an actually input answer, the user can reliably input an answer, the number of answer input errors decreases, and the time taken to input an answer is shortened, thereby allowing a smooth conversation. Furthermore, once a failure occurs in a given answer input mode, its priority decreases. It is, therefore, possible to decrease the possibility that the same user repeats the same mistake.

The above-described individual processes of the units 11 to 18 and 1301 to 1303 of the voice conversation support apparatus can be performed as software processes by computer programs. In this case, it is possible to record the programs in a recording medium, or provide the programs via a network.

While certain embodiments have been described, these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A voice conversation support apparatus for supporting a user to have a conversation, comprising:
    an input unit configured to accept a text data input according to a voice input mode and another input mode, wherein the voice input mode converts a voice uttered by the user into text data, wherein another input mode accepts an input operation from the user;
    a first determination unit configured to extract at least one subject keyword representing a current subject from the text data input;
    a second determination unit configured to extract a question pair of a question sentence and an answer sentence by determining whether the text data input is at least one of a question sentence and an answer sentence, and estimate a category of a word that can be an answer based on a format of the question sentence and the subject keyword, as a temporary answer category, when the text data input is the question sentence;
    a third determination unit configured to estimate a category of a answered content based on the answer sentence, and calculate a question pair likelihood based on at least one of the temporary answer category and the answer category, when the question pair is obtained;
    a scoring unit configured to calculate a score about a priority of each input mode based on the temporary answer category and the question pair likelihood; and
    a screen generation unit configured to display the input modes in an order of the scores calculated by the scoring unit.

2. The apparatus according to claim 1, further comprising a translation unit configured to obtain an input sentence by translating the text data input to the input unit at least one of from a first language into a second language and from the second language into the first language.

3. The apparatus according to claim 1, wherein the input unit includes at least one of a direct input mode of directly inputting text data, an option input mode of presenting a plurality of options and accepting a selection input from the user, a drawing pointing input mode of displaying a drawing and accepting an input of a term shown in the drawing by pointing by the user, and a numeric value input mode of displaying a numeric keypad and accepting an input of a numeric value from the user, as the other input mode.

4. The apparatus according to claim 1, wherein the third determination unit calculates the question pair likelihood based on a time taken to input the answer and at least one of the temporary answer category and the answer category, when the question pair is obtained.

5. The apparatus according to claim 1, further comprising an accumulation unit configured to hold a reliability value for each input mode of the input unit as a method of inputting a word of the temporary answer category,
wherein the scoring unit calculates the score by using the reliability value accumulated in the accumulation unit when only the question sentence is obtained.

6. The apparatus according to claim 1, further comprising an option generation unit configured to generate an option as an answer candidate based on the temporary answer category, when the second determination unit determines that the text data input is the question sentence,
wherein the scoring unit calculates the score about the priority of each input mode based on the generated option in addition to the temporary answer category and the question pair likelihood.

7. The apparatus according to claim 1, further comprising a profile accumulation unit configured to hold speaker profile information including at least a position, used language, and sex of the user,
wherein the scoring unit calculates the score by using the speaker profile information as well.

8. The apparatus according to claim 1, further comprising a subject input unit configured to allow the user to input a detailed subject keyword,
wherein the first determination unit selects a subject keyword including the subject keyword input by the subject input unit.

9. A voice conversation support method for a voice conversation support apparatus for supporting a user to have a conversation, comprising:
accepting a text data input according to a voice input mode and another input mode, wherein the voice input mode converts a voice uttered by the user into text data, wherein another input mode accepts an input operation from the user;
extracting at least one subject keyword representing a current subject from the text data input;
extracting a question pair of a question sentence and an answer sentence by determining whether the text data input is at least one of a question sentence and an answer sentence, and estimate a category of a word that can be an answer based on a format of the question sentence and the subject keyword, as a temporary answer category, when the text data input is the question sentence;
estimating a category of a answered content based on the answer sentence, and calculating a question pair likelihood based on at least one of the temporary answer category and the answer category, when the question pair is obtained;
calculating a score about a priority of each input mode based on the temporary answer category and the question pair likelihood; and
displaying the input modes in an order of the calculated scores.

10. A non-transitory computer readable medium having stored thereon a computer program which is executable by a computer, the computer program controlling the computer to execute functions of:
accepting a text data input according to a voice input mode and another input mode, wherein the voice input mode converts a voice uttered by the user into text data, wherein another input mode accepts an input operation from the user;
extracting at least one subject keyword representing a current subject from the text data input;
extracting a question pair of a question sentence and an answer sentence by determining whether the text data input is at least one of a question sentence and an answer sentence, and estimating a category of a word that can be an answer based on a format of the question sentence and the subject keyword, as a temporary answer category, when the text data input is the question sentence;
estimating a category of a answered content based on the answer sentence, and calculate a question pair likelihood based on at least one of the temporary answer category and the answer category, when the question pair is obtained;
calculating a score about a priority of each input mode based on the temporary answer category and the question pair likelihood; and
displaying the input modes in an order of the calculated scores.

\* \* \* \* \*